United States Patent
Lin et al.

(10) Patent No.: US 12,493,415 B2
(45) Date of Patent: Dec. 9, 2025

(54) PROGRAM PULSE MODIFICATION

(71) Applicant: Micron Technology, Inc., Boise, ID (US)

(72) Inventors: Lei Lin, Fremont, CA (US); Peng Zhang, Los Altos, CA (US); Pitamber Shukla, San Jose, CA (US); Zhengang Chen, San Jose, CA (US); Zhenming Zhou, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 40 days.

(21) Appl. No.: 18/406,852

(22) Filed: Jan. 8, 2024

(65) Prior Publication Data

US 2024/0248612 A1 Jul. 25, 2024

Related U.S. Application Data

(60) Provisional application No. 63/440,633, filed on Jan. 23, 2023.

(51) Int. Cl.
*G06F 3/06* (2006.01)

(52) U.S. Cl.
CPC .......... *G06F 3/0619* (2013.01); *G06F 3/0659* (2013.01); *G06F 3/0679* (2013.01)

(58) Field of Classification Search
CPC ..... G06F 3/0619; G06F 3/0659; G06F 3/0679
See application file for complete search history.

(56) References Cited

U.S. PATENT DOCUMENTS

| 11,335,429 B1* | 5/2022 | Hu ......................... G11C 29/52 |
|---|---|---|
| 2014/0029348 A1 | 1/2014 | Tan |
| 2016/0018998 A1 | 1/2016 | Mohan et al. |
| 2020/0090770 A1 | 3/2020 | Yang et al. |
| 2021/0343335 A1 | 11/2021 | Chiang |
| 2022/0113896 A1* | 4/2022 | Ahn ....................... G06F 3/0614 |
| 2022/0270702 A1* | 8/2022 | Hu ......................... G11C 29/021 |
| 2022/0392560 A1 | 12/2022 | Tran et al. |
| 2023/0176748 A1* | 6/2023 | Zhao ....................... G11C 16/08 |
| | | 365/230.05 |

FOREIGN PATENT DOCUMENTS

WO 2024158547 8/2024

OTHER PUBLICATIONS

"International Application Serial No. PCT US2024 010703, International Search Report mailed May 2, 2024", 4 pgs.
"International Application Serial No. PCT US2024 010703, Written Opinion mailed May 2, 2024", 4 pgs.

* cited by examiner

*Primary Examiner* — Cynthia Britt
(74) *Attorney, Agent, or Firm* — Schwegman Lundberg & Woessner, P.A.

(57) ABSTRACT

Aspects of the present disclosure configure a system component, such as a memory sub-system controller, to modify pulses used to program memory components. The controller receives a request to program data in an individual memory component of a set of memory components. The controller computes a plurality of memory reliability criteria associated with the individual memory component and compares the plurality of memory reliability criteria to one or more threshold values. The controller selects a program pulse used to program the data to the individual memory component based on a result of comparing the plurality of memory reliability criteria to the one or more threshold values.

20 Claims, 7 Drawing Sheets

| Criteria No | Threshold Conditions | Trimset to load |
|---|---|---|
| 1 | < PEC_Boundary_1 and/or <CFByte/CFBit_1 and/or <RBER_Boundary_1 | Trimset0 |
| 2 | >=PEC_Boundary_1 and < PEC_Boundary_2 and/or >= CFByte/CFBit_1 and < CFByte/CFBit_2 and/or >=RBER_Boundary_1 and >=RBER_Boundary_2 | Trimset1 |
| 3 | >=PEC_Boundary_2 and < PEC_Boundary_3 and/or >=RBER_Boundary_2 and >=RBER_Boundary_3 and/or >= CFByte/CFBit_2 and < CFByte/CFBit_3 | Trimset2 |

PROGRAM PULSE MODIFICATION

PRIORITY APPLICATION

This application claims the benefit of priority to U.S. Provisional Application Ser. No. 63/440,633, filed Jan. 23, 2023, which is incorporated herein by reference in its entirety.

TECHNICAL FIELD

Embodiments of the disclosure relate generally to memory sub-systems and more specifically to managing program pulses when writing data in a memory sub-system.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure configure a system component, such as a memory sub-system controller, to write or program data to one or more memory components using different program pulses (e.g., program pulses having different voltage levels) based on a combination of multiple criteria. Data can be written to a memory component at different levels each associated with a different program voltage. The speed at which the data is written to the memory can vary based on the strength of the program pulse used to program the data. Over time, certain memory components can be subject to different read errors and different reliability metrics. In order to ensure that data is consistently written to the memory quickly and with a certain level of reliability, the disclosed controller varies the value or strength of the program pulse based on a combination of criteria. Specifically, the controller can determine any combination of program erase cycle (PEC) counts, read bit error rate (RBER) value, quantity of inhibited cells that result following initial programming, and/or one or more check failure unit count values in association with an individual memory component, and use this combination as a basis to select the strength of the program pulse used to store data to the individual memory component. In this way, the speed at which data is written to the memory sub-system can be optimized to reduce errors (read or write errors) which improves the overall function of the memory sub-system.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices that store data. The host system can send access requests (e.g., write command, read command, sequential write command, sequential read command) to the memory sub-system, such as to store data at the memory sub-system and to read data from the memory sub-system. The data specified by the host is hereinafter referred to as "host data" or "user data."

The memory sub-system can initiate media management operations, such as a write operation, on host data that is stored on a memory device. For example, firmware of the memory sub-system may rewrite previously written host data from a location on a memory device to a new location as part of garbage collection management operations. The data that is rewritten, for example as initiated by the firmware, is hereinafter referred to as "garbage collection data."

"User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, and so forth.

A memory device can be a non-volatile memory device. A non-volatile memory device is a package of one or more dice. Each die can comprise one or more planes. Each logical block address (LBA) of the memory device comprises a set of pages. Each page comprises a set of memory cells, which store bits of data. The memory devices can be raw memory devices (e.g., negative-and (NAND)), which are managed externally, for example, by an external controller. The memory devices can be managed memory devices (e.g., managed NAND), which is a raw memory device combined with a local embedded controller for memory management within the same memory device package.

Conventional memory sub-systems program data in the memory cells by applying one or more program pulses. Depending on the strength or voltage level of the program pulse, the data can be programmed faster. Namely, a stronger program pulse can result in the programming of data and storage of the data in the memory cells at a faster rate. However, if the program pulse is too strong or a voltage level that is applied is too high, the data that is programmed in a given cell at a given level can have some charges shift to a neighboring level. This results in the introduction of read errors or program errors. This is particularly the case as the reliability or age of the memory cells deteriorates. For example, memory cells with program erase cycles that transgress some threshold can have poorer performance and reliability, meaning that applying pulses that are too strong can cause the charge to shift to neighboring cells. Strong programming pulses in general also cause more stress to the cell which degrades reliability.

In some cases, data can be stored and represented in the memory sub-system at different read levels. Specifically, in a tri-level cell (TLC) memory device, data can be stored in one of eight different read levels of the memory sub-system. Charges stored at the different read levels can be read and interpreted into a set of three bits. Ideally, the data is read by applying a read level within a center of valley (CoV), which defines a range of voltage levels that can be applied to accurately read the data from an individual one of the eight different read levels. In certain situations, the charges stored at one of the read levels can be lost or shift around due to the application of program pulses that are too strong or too weak. This results in inaccuracies when read at the predetermined read level or even within a previously computed CoV. These operations can cause abnormal firmware or controller behavior and abnormal memory component behavior. Also, the efficiency of operating these conventional memory systems is reduced as data may need to be programmed and/or read multiple times.

Typical memory systems employ a look-up table that maps different PEC counts to different program pulse values. By using the look-up table, different program pulse values can be applied to the storage of data based on the age or PEC count of the memory component to which the data is being stored. This can address some of the issues that arise and can dynamically adjust the speed at which data is stored based on the PEC count of the memory systems. While these approaches generally work well, there are several other factors that can impact the overall performance and speed of the memory systems. Namely, relying on a single criterion (e.g., the PEC count) to control the speed at which data is programmed can cause erratic behavior and may cause data to be stored at a slower speed than necessary. This is because while PEC count can be high, the reliability of the memory cell can still be high and the memory cell may be able to tolerate program pulses that are greater than expected. Therefore, a look-up table-based approach can cause poor write latency.

Aspects of the present disclosure address the above and other deficiencies by configuring a system component, such as a memory sub-system controller of a memory sub-system, to dynamically select the value of the program pulse used to program data into the memory components. The program pulse is selected based on multiple criteria, such as the PEC count, an inhibited cell count, a quantity of inhibited cells after a first loop of programming which can be a good indicator of program speed, a read bit error rate (RBER), a CFBit/CFByte count value, and/or any other condition, criterion or factor that is indicative of and represents reliability of the memory component. Particularly, the disclosed controller receives a request to program data in an individual memory component of a set of memory components. The controller computes a plurality of memory reliability criteria associated with the individual memory component and compares the plurality of memory reliability criteria to one or more threshold values. The controller selects a program pulse used to program the data to the individual memory component based on a result of comparing the plurality of memory reliability criteria to the one or more threshold values.

In some examples, the plurality of memory reliability criteria includes an average program erase count (PEC) value and at least one additional metric. In some examples, the at least one additional metric includes a RBER value. In some examples, the at least one additional metric includes a quantity of inhibited cells that result following initial programming of the individual memory component. In some examples, the inhibited cells represent cells that have been improperly programmed, the quantity of inhibited cells being determined in a verify stage of memory programming operations. In some examples, the at least one additional metric includes one or more check failure unit count values including at least one of one or more check failure bit (CFBit) count values or one or more check failure byte (CFByte) count values. As referred to herein, CFByte count values corresponds to eight or more CFBit count values.

In some examples, the controller computes one or more check failure unit count values corresponding to an individual read level of the individual memory component. The controller compares the one or more check failure unit count values to a threshold value of the one or more threshold values.

In some examples, the controller selects a first value for the program pulse in response to determining that the one or more check failure unit count values fails to transgress the threshold value. The controller selects a second value for the program pulse in response to determining that the one or more check failure unit count values transgresses the threshold value.

In some examples, the controller retrieves the PEC count value corresponding to the individual memory component and compares the PEC count value corresponding to the individual memory component to an additional threshold value of the one or more threshold values. The controller selects a value for the program pulse based on a first result of comparing the one or more check failure unit count values to the threshold value and a second result of comparing the PEC count value corresponding to the individual memory component to the additional threshold value.

In some examples, the controller accesses a predetermined check failure unit count value associated with the individual read level. The controller computes the threshold value as a function of the predetermined check failure unit count value. In some examples, the program pulse includes a trimset voltage value.

In some examples, the controller stores a look-up table that maps a plurality of program pulse values to respective combinations of the plurality of memory reliability criteria. In some examples, the plurality of memory reliability criteria includes a quantity of inhibited cells that result following initial programming of the individual memory component and one or more check failure unit count values.

In some examples, the controller computes the one or more check failure unit count values corresponding to an individual read level of the individual memory component and compares the one or more check failure unit count values to a threshold value of the one or more threshold values. The controller computes the quantity of inhibited cells corresponding to the individual memory component and compares the quantity of inhibited cells to an additional threshold value of the one or more threshold values.

In some examples, the controller selects a value for the program pulse based on a first result of comparing the one or more check failure unit count values to the threshold value and a second result of comparing the quantity of inhibited cells to the additional threshold value. In some examples, the controller selects a value for the program pulse based on comparing the quantity of inhibited cells associated with the individual memory component to the one or more check failure unit count values associated with an individual read level of the individual memory component.

Though various embodiments are described herein as being implemented with respect to a memory sub-system (e.g., a controller of the memory sub-system, a memory component, a media controller, or combination thereof), some or all of the portions of an embodiment can be implemented with respect to a host system, such as a software application, an operating system of the host system, or only by the media controller rather than or in addition to the memory sub-system controller.

Figure 1:
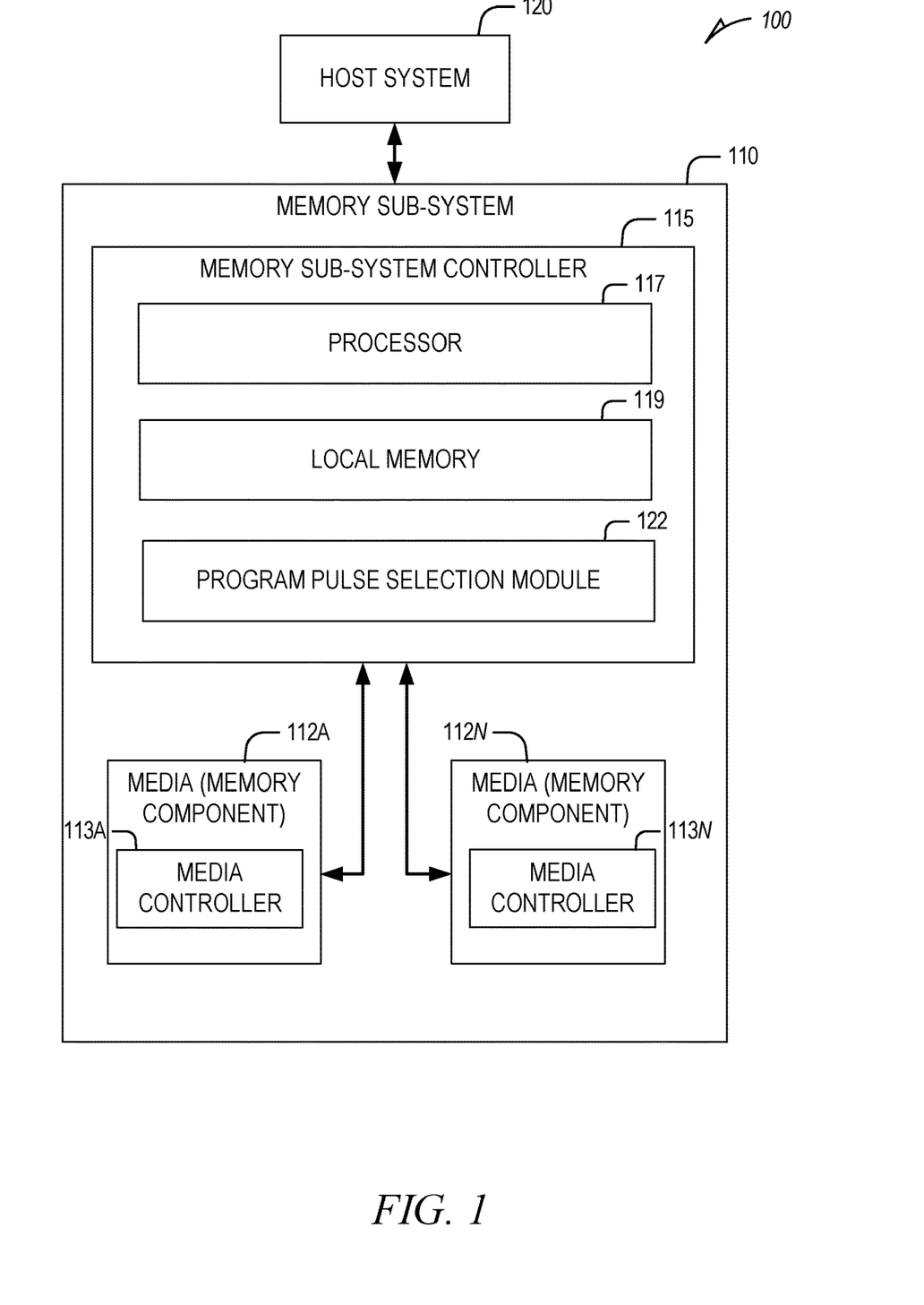
FIG. 1 is a block diagram illustrating an example computing environment including a memory sub-system, in accordance with some embodiments of the present disclosure.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. In some embodiments, the memory sub-system 110 is a storage system. A memory sub-system 110 can be a storage device, a memory module, or a hybrid of a storage device and memory module. Examples of a storage device include a SSD, a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, and so forth.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a USB interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND)-type flash memory. Each of the memory components 112A to 112N can include one or more arrays of memory cells such as single-level cells (SLCs) or multi-level cells (MLCs) (e.g., TLCs or quad level cells (QLCs)). In some embodiments, a particular memory component 112 can include both an SLC portion and an MLC portion of memory cells. Each of the memory cells can store one or more bits of data (e.g., pages and/or blocks) used by the host system 120.

Although non-volatile memory components such as NAND-type flash memory are described, the memory components 112A to 112N can be based on any other type of memory, such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or LBAs that can refer to a unit of the memory component 112 used to store data. In some examples, the memory cells of the memory components 112A to 112N can be grouped into a set of different zones of equal or unequal size used to store data for corresponding applications. In such cases, each application can store data in an associated zone of the set of different zones.

A memory sub-system controller 115 can communicate with the memory components 112A to 112N to perform operations such as reading data, writing data, or erasing data at the memory components 112A to 112N and other such operations. The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include ROM for storing microcode. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. The memory sub-system controller 115 can be responsible for other operations such as wear leveling operations, garbage collection operations, error detection and ECC operations, decoding operations, encryption operations, caching operations, address translations between a logical block address and a physical block address that are associated with the memory components 112A to 112N, address translations between an application identifier received from the host system 120 and a corresponding zone of a set of zones of the memory components 112A to 112N. This can be used to restrict applications to reading and writing data only to/from a corresponding zone of the set of zones that is associated with the respective applications. In such cases, even though there may be free space elsewhere on the memory components 112A to 112N, a given application can only read/write data to/from the associated zone, such as by erasing data stored in the zone and writing new data to the zone. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which is a raw memory device combined with a local embedded controller (e.g., local media controllers) for memory management within the same memory device package. Any one of the memory components 112A to 112N can include a media controller (e.g., media controller 113A and media controller 113N) to manage the memory cells of the memory component, to communicate with the memory sub-system controller 115, and to execute memory requests (e.g., read or write) received from the memory sub-system controller 115.

The memory sub-system 110 includes a program pulse selection module 122 that performs or facilitates selecting a program pulse value (e.g., voltage value) based on multiple memory reliability criteria or conditions associated with one or more memory components 112A to 112N, in accordance with some embodiments described herein. In some embodiments, the controller 115 includes at least a portion of the program pulse selection module 122. For example, the controller 115 can include a processor 117 (processing device) configured to execute instructions stored in local memory 119 for performing the operations described herein. In some embodiments, the program pulse selection module 122 is part of the host system 120, such as a software application or an operating system on the host system 120. In some embodiments, the program pulse selection module 122 is part of the media controller 113A and/or media controller 113N.

According to some embodiments, the program pulse selection module 122 receives a request to program data in an individual memory component of the set of memory components 112A to 112N. The program pulse selection module 122 computes a plurality of memory reliability criteria associated with the individual memory component. The program pulse selection module 122 compares the plurality of memory reliability criteria to one or more threshold values and selects a program pulse used to program the data to the individual memory component based on a result of comparing the plurality of memory reliability criteria to the one or more threshold values. For example, the program pulse selection module 122 can determine a quantity of inhibited cells associated with the individual memory component after an initial or first loop of information is stored to the individual memory component in combination with the check failure unit count value (e.g., CFByte/CFBit) at a particular level (e.g., L0 or L1) of the individual memory component. Based on comparing the quantity of inhibited cells to a first threshold and the CFByte/CFBit at a particular level to a second threshold, the program pulse selection module 122 can select a value for the program pulse that is used to program data to the individual memory component.

The check failure unit count values, as referred to herein, represent a count of a total quantity of bits (in case of CFBit count value) and/or total quantity of bytes (in case of CFByte count value) that are programmed (e.g., have a '0' logic level) or represented by one or more individual read levels of the memory components 112A-N. The CFBit count value and CFByte count value can be cumulative such that read levels associated with higher read voltages have a higher CFBit/CFByte count value than read levels associated with lower read voltages.

In some examples, the memory components 112 can generate and assign a total predetermined CFBit/CFByte count value and divide that total predetermined CFBit/CFByte count value by the total number of read levels that can be used to stored data in the memory components 112A-N. For example, the program pulse selection module 122 can store a first predetermined CFBit/CFByte count value representing a first total quantity of bits/bytes that can be programmed at a first read level (e.g., L0 or L1) of a plurality of read levels and can store a second predetermined CFBit/CFByte count value representing a second total quantity of bits/bytes that can be programmed at a second read level (e.g., L2) of a plurality of read levels. The first total quantity can correspond to the total predetermined CFBit/CFByte count value and the second total quantity can correspond to the total predetermined CFBit/CFByte count value minus the value computed by dividing that total predetermined CFBit/CFByte count value by the total number of read levels. This process can continue until each read level is associated with the predetermined total quantity of bits/bytes to generate and associate the CFBit/CFByte count value with each read level.

The program pulse selection module 122 can generate a first threshold associated with a CFBit count value that is used to select the program pulse value used to program data to the individual read level. In some examples, the first threshold is computed as a function of the predetermined CFBit count value associated with the individual read level. For example, the first threshold can correspond to 10, 20, or 30 percent of the corresponding predetermined CFBit count value associated with the individual read level.

Depending on the embodiment, the program pulse selection module 122 can comprise logic (e.g., a set of transitory or non-transitory machine instructions, such as firmware) or one or more components that causes the memory sub-system 110 (e.g., the memory sub-system controller 115) to perform operations described herein with respect to the program pulse selection module 122. The program pulse selection module 122 can comprise a tangible or non-tangible unit capable of performing operations described herein. Further details with regards to the operations of the program pulse selection module 122 are described below.

Figure 2:
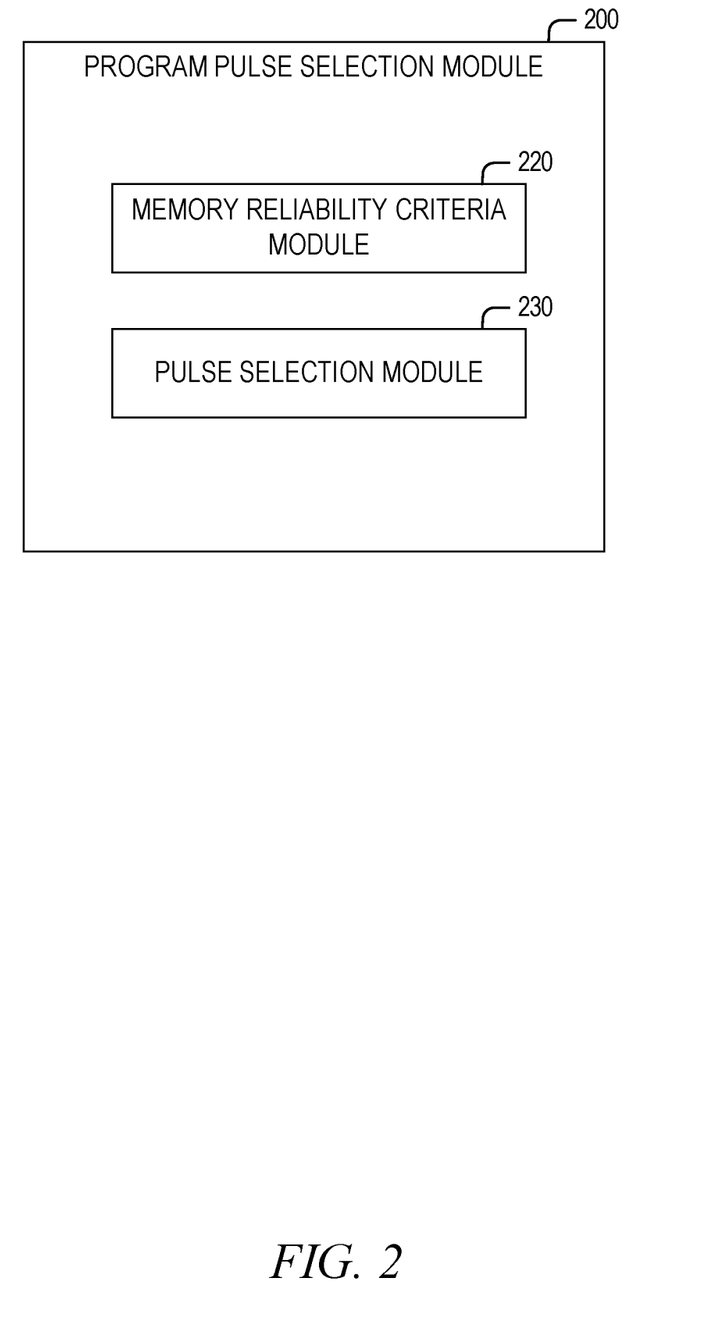
FIG. 2 is a block diagram of an example program pulse selection module, in accordance with some implementations of the present disclosure.

FIG. 2 is a block diagram of an example program pulse selection module 200, in accordance with some implementations of the present disclosure. As illustrated, the program pulse selection module 200 includes a memory reliability criteria module 220 and a pulse selection module 230. For some embodiments, the program pulse selection module 200 can differ in components or arrangement (e.g., less or more components) from what is illustrated in FIG. 2. The program pulse selection module 200 can be implemented by the memory sub-system controller 115 and/or by one or more of the media controllers 113A-N.

The program pulse selection module 200 can be used in case of receiving a request to write or program data to an individual memory component to set the program pulse value that is used to program the data in the individual memory component. In such cases, the program pulse selection module 200 can compute a first memory reliability criterion (e.g., a quantity of check failure unit count value) of the individual memory component. In some cases, the program pulse selection module 200 can perform the disclosed operations as a background process without receiving or not in response to receiving a request to write/read data from a host.

The program pulse selection module 200 can also compute a second memory reliability criterion (e.g., a quantity of inhibited cells after initial programming or current PEC count value). The program pulse selection module 200 then compares the first and second memory reliability criteria to respective thresholds. The program pulse selection module 200 selects a value for the program pulse based on whether one or both of the first and second memory reliability criteria transgress the respective thresholds. In some cases, the program pulse selection module 200 selects a first value if the first memory reliability criterion transgresses a first threshold, selects a second value if the first memory reliability criterion falls between the first threshold and a second threshold, and selects a third value if the first memory reliability criterion is greater than the second threshold.

Figure 3:
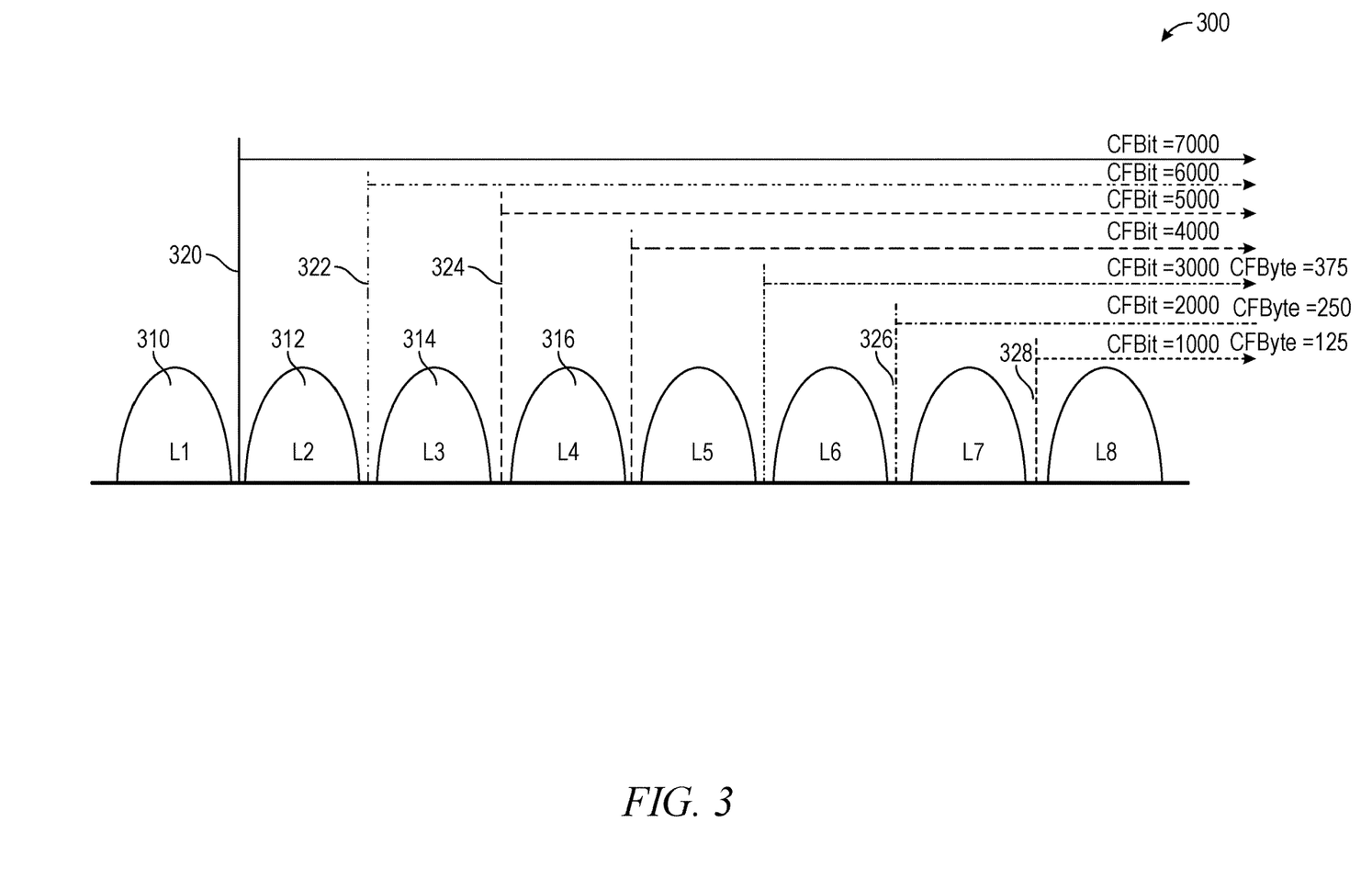
FIG. 3 presents a list of different read levels, check failure bit (CFBit) count values and check failure byte (CFByte) count values of the associated center of valleys (CoVs), in accordance with some implementations of the present disclosure.

For example, as in the distribution of CFBits/CFBytes 300 shown in FIG. 3, the memory components 112 can store data in one of eight different levels (L1-L8). Each of the different levels can be read by applying a different read threshold voltage (read level). For example, data stored in a first level 310 can be read by applying a first range of read levels, data stored in a second level 312 can be read by applying a second range of read levels, data stored in a third level 314 can be read by applying a third range of read levels, and data stored in a fourth level 316 can be read by applying a fourth range of read levels. Ideally, the read level that is applied to optimally and most effectively read data from a particular level is defined by a CoV, such as a first CoV 320, a second CoV 322, a third CoV 324, a fourth CoV 326, and a fifth CoV 328.

In order to enable the program pulse selection module 200 to select the program pulse value used to program data in a given level of the individual memory component, the memory components 112 store or generate ideal or predetermined CFBit/CFByte count values for each level. For example, the first CoV 320 can be associated with a first CFBit count (e.g., 7000), the second CoV 322 can be associated with a second CFBit count (e.g., 6000), and the third CoV 324 can be associated with a third CFBit count (e.g., 5000). The fourth CoV 326 can correspond to a CFBit count of 2000 and a CFByte count of 250 and the fifth CoV 328 can correspond to a CFBit count of 1000 and a CFByte count of 125. These are all illustrative, and example quantities and the CFBit and CFByte values can be computed and set to different quantities than these disclosed quantities. It can be seen that the CFBit counts differ by a predetermined quantity between each corresponding CoV that is read. Using this information, the memory reliability criteria module 220 can determine and identify whether a current check failure count value of a given level transgresses a threshold value to select the appropriate program pulse value for programming data in the individual memory component.

Figure 4:
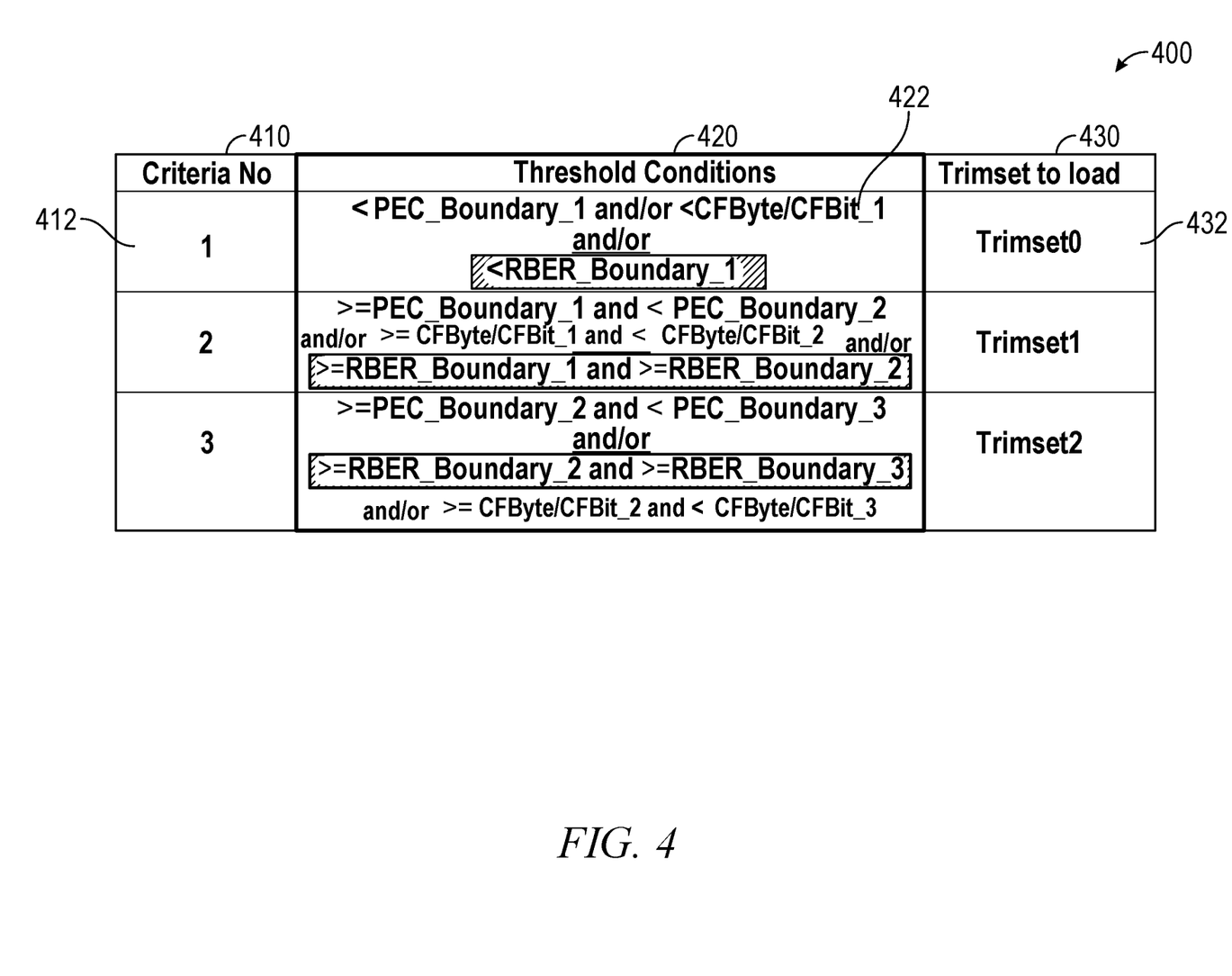
FIG. 4 presents an example program pulse selection look-up table, in accordance with some implementations of the present disclosure.

For example, as shown in FIG. 4, the pulse selection module 230 stores a look-up table 400 that maps different memory reliability criteria to respective different program pulse values and/or offsets. Specifically, the look-up table 400 stores a plurality of criteria 410 corresponding to respective thresholds 420 and program pulse values and/or offsets 430. The memory reliability criteria module 220 can receive a request from a host to program data into an individual memory component. In response, the memory reliability criteria module 220 communicates with the pulse selection module 230 to obtain a list of criteria 410 that are stored in the look-up table 400. The memory reliability criteria module 220 computes memory reliability values corresponding to each criterion for the individual memory component and obtains the respective thresholds 420 from the pulse selection module 230. The memory reliability criteria module 220 can then determine if one or more of the memory reliability values transgress the thresholds. Based on the determination, the memory reliability criteria module 220 obtains from the pulse selection module 230 the corresponding program pulse value and/or offset to use to program the data to the individual memory component.

In some examples, the criteria 410 includes a first combination of criteria 412. The first combination of criteria 412 includes a first set of conditions 422 with particular memory reliability thresholds. In some cases, the first set of conditions 422 include a first memory reliability criterion that includes a first average PEC boundary or threshold and a second memory reliability criterion that includes a first RBER boundary or threshold. The memory reliability criteria module 220 then retrieves and/or computes the current RBER value associated with the individual memory component. The memory reliability criteria module 220 also retrieves and/or computes the first RBER boundary or value of the individual memory component.

The memory reliability criteria module 220 compares the current average PEC count value to the first average PEC boundary or threshold. The memory reliability criteria module 220 also compares the current RBER value to the first RBER boundary or threshold. The memory reliability criteria module 220 determines that either or both of the current average PEC count value transgresses the first average PEC boundary or threshold and/or the current RBER value transgresses the first RBER boundary or threshold. In response to determining that either or both of the current average PEC count value transgresses the first average PEC boundary or threshold and/or the current RBER value fails to transgress the first RBER boundary or threshold, the memory reliability criteria module 220 retrieves the trimset 432 associated with the first combination of criteria 412 to use as the program pulse for programming the data to the individual memory component. In response to determining that either or both of the current average PEC count value transgresses the first average PEC boundary or threshold and/or the current RBER value transgresses the first RBER boundary or threshold, the memory reliability criteria module 220 accesses a second average PEC boundary or threshold and a second RBER boundary or threshold corresponding to a second combination of criteria. In response to determining that either or both of the current average PEC count value fails to transgress the second average PEC boundary or threshold and/or the current RBER value fails to transgress the second RBER boundary or threshold, the memory reliability criteria module 220 retrieves the trimset associated with the second combination of criteria to use as the program pulse for programming the data to the individual memory component.

In some cases, instead of or in addition to an RBER boundary or threshold, the memory reliability criteria module 220 can also consider the CFByte/CFBit value associated with a first level of the individual memory component. In some cases, instead of or in addition to an RBER boundary or threshold, the memory reliability criteria module 220 can also consider the quantity of inhibited bits resulting from initial programming of the individual memory component. For example, the memory reliability criteria module 220 can program the individual memory component a first time or initially (e.g., after the individual memory component is powered up and/or after the individual memory component is erased). After programming the individual memory component, the memory reliability criteria module 220 can perform a verify operation to count how many of the bits were improperly or erroneously programmed. The quantity of these bits is stored as the quantity of inhibited bits resulting from initial programming of the individual memory component.

The memory reliability criteria module 220 can compare the quantity of inhibited bits to a first threshold. If the quantity of inhibited bits fails to transgress the first threshold, the memory reliability criteria module 220 can use a first value for the program pulse used to program data to the individual memory component. If the quantity of inhibited bits transgresses the first threshold, the memory reliability criteria module 220 can compare the quantity of inhibited bits to a second threshold. If the quantity of inhibited bits fails to transgress the second threshold, the memory reliability criteria module 220 can use a second value for the program pulse used to program data to the individual memory component. In some cases, the memory reliability criteria module 220 compares the quantity of inhibited bits to a CFBit/CFByte of the first level of the individual memory component. The memory reliability criteria module 220 can select the program pulse value based on whether the quantity of inhibited bits transgresses the CFBit/CFByte of the first level of the individual memory component.

Figure 5:
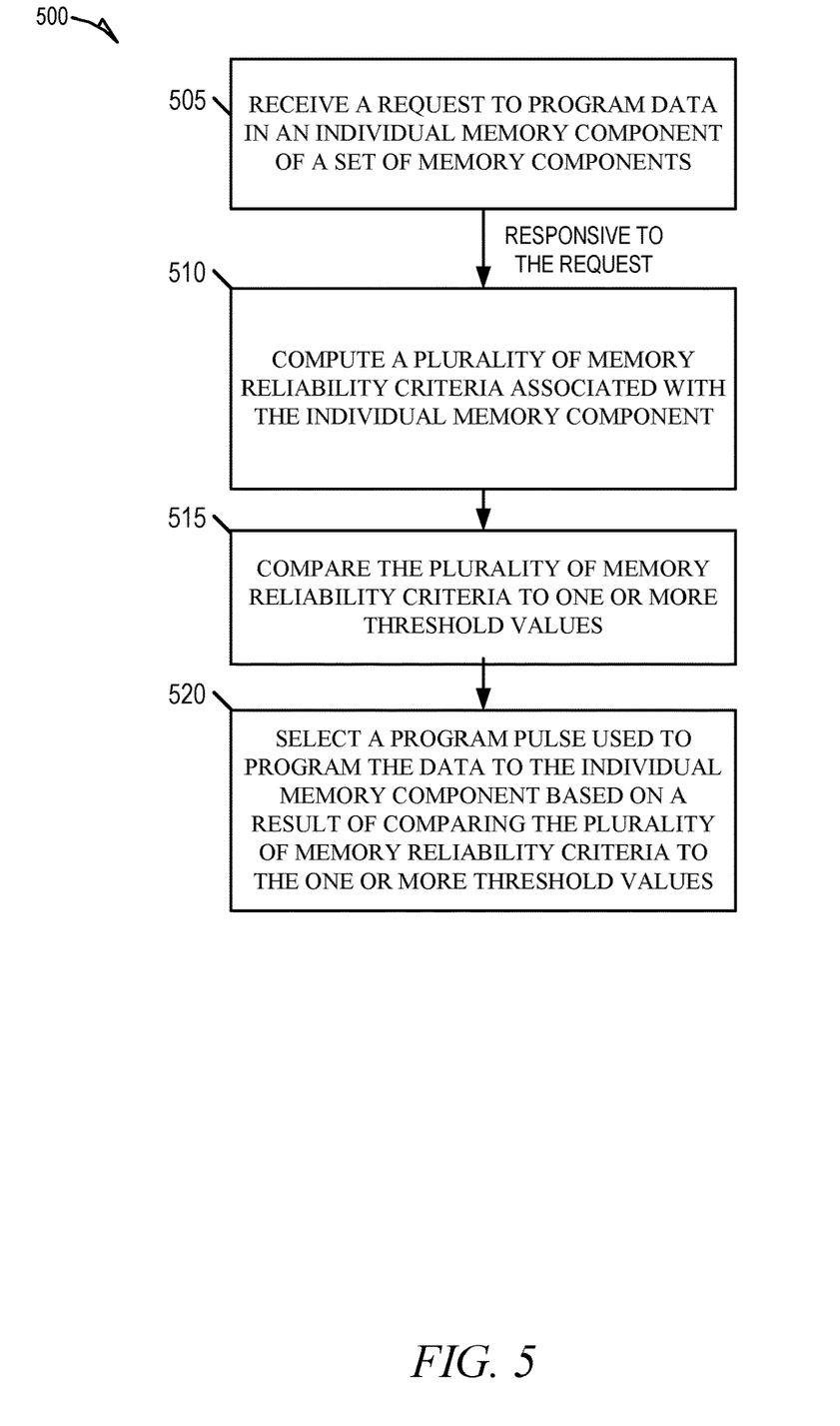
FIGS. 5 and 6 are flow diagrams of example methods to perform dynamic program pulse selection, in accordance with some implementations of the present disclosure.

FIG. 5 is a flow diagram of an example method 500 to perform program pulse selection, in accordance with some implementations of the present disclosure. Method 500 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 500 is performed by the memory sub-system controller 115 of FIG. 1. In these embodiments, the method 500 can be performed, at least in part, by the program pulse selection module 122. Although the processes are shown in a particular sequence or order, unless otherwise specified, the order of the processes can be modified. Thus, the illustrated embodiments should be understood only as examples; the illustrated processes can be performed in a different order, and some processes can be performed in parallel. Additionally, one or more processes can be omitted in various embodiments. Thus, not all processes are required in every embodiment. Other process flows are possible.

Referring now to FIG. 5, the method (or process) 500 begins at operation 505, with a processing device of a memory sub-system (e.g., of processor of the memory sub-system controller 115) receiving a request to program data in an individual memory component of the set of memory components. In some cases, the method 500 begins with operation 510, where the operations are performed in the background independently of any host read/write requests being received. In these cases, operation 505 can be skipped.

At operation 510, the processing device of the memory sub-system, in response to detecting the read error at operation 505, computes a plurality of memory reliability criteria associated with the individual memory component. Then, the processing device of the memory sub-system, at operation 515, compares the plurality of memory reliability criteria to one or more threshold values and, at operation 520, selects a program pulse used to program the data to the individual memory component based on a result of comparing the plurality of memory reliability criteria to the one or more threshold values.

Figure 6:
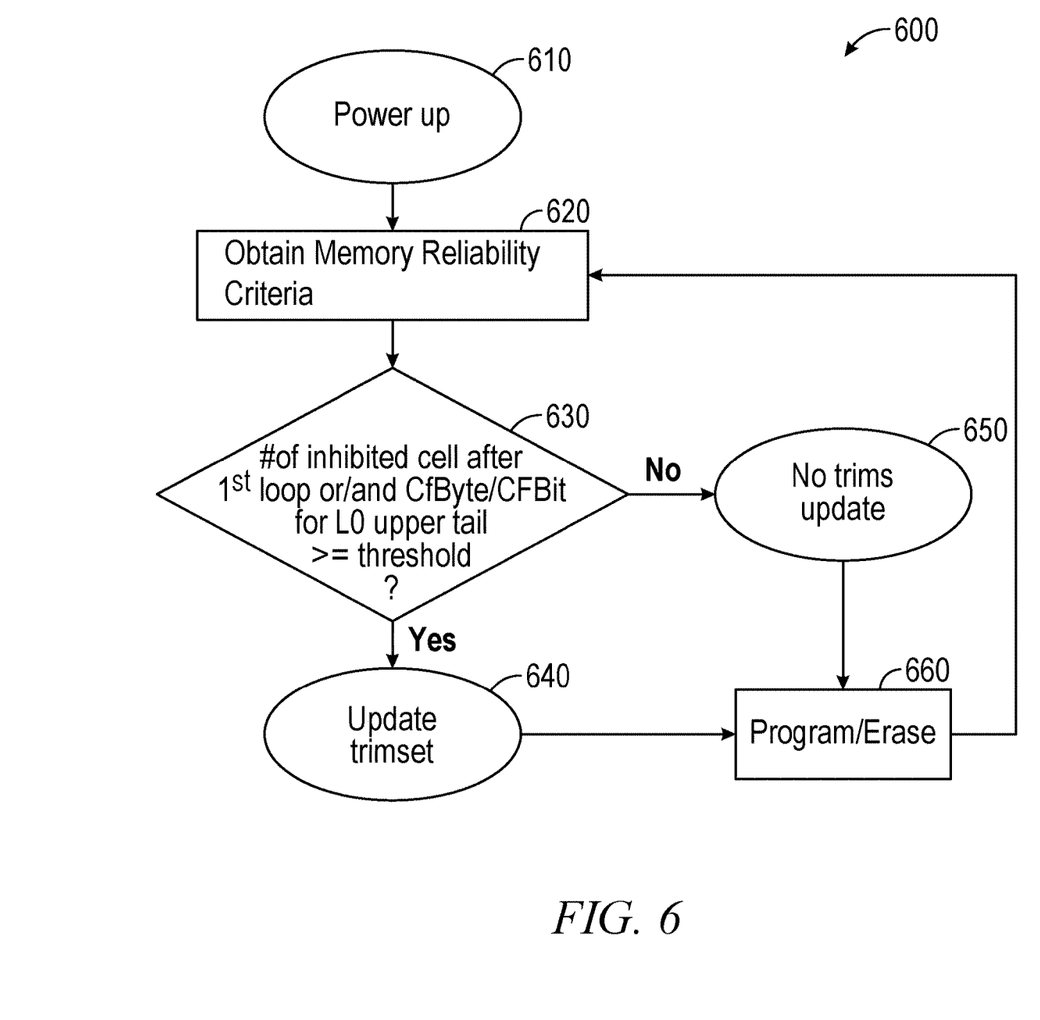

FIG. 6 is a flow diagram of an example method 600 to perform program pulse selection, in accordance with some implementations of the present disclosure. Method 600 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 600 is performed by the memory sub-system controller 115 of FIG. 1. In these embodiments, the method 600 can be performed, at least in part, by the program pulse selection module 122. Although the processes are shown in a particular sequence or order, unless otherwise specified, the order of the processes can be modified. Thus, the illustrated embodiments should be understood only as examples; the illustrated processes can be performed in a different order, and some processes can be performed in parallel. Additionally, one or more processes can be omitted in various embodiments. Thus, not all processes are required in every embodiment. Other process flows are possible.

Referring now to FIG. 6, the method (or process) 600 begins at operation 610, with a processing device of a memory sub-system (e.g., of processor of the memory sub-system controller 115) powering up the memory sub-system 110. Then, at operation 620, such as in response to receiving a request to program data to an individual memory component, the memory sub-system controller 115 obtains a plurality of memory reliability criteria. For example, the memory sub-system controller 115 obtains the average PEC count of all the memory components of the memory sub-system 110 and/or the average PEC count of the individual memory component. The memory sub-system controller 115 also checks the RBER of the individual memory component. Based comparing the average PEC count and/or the RBER to one or more thresholds, at operation 630, the memory sub-system controller 115 determines if the values transgress the thresholds. For example, the memory sub-system controller 115 checks if the quantity of inhibited cells after initial programming of the individual memory component and/or the CFBit/CFByte of a lowest, middle or highest level of a plurality of levels of the individual memory component transgress respective thresholds. At operation 640, if one or more of the values transgress the thresholds, the memory sub-system controller 115 updates the current program pulse value (e.g., trimset) used to program the data to the individual memory component, such as by reducing the voltage value. Otherwise, at operation 650, if one or more of the values fails to transgress the thresholds, the memory sub-system controller 115 keeps the current program pulse value (e.g., trimset). Then, at operation 660, the memory sub-system controller 115 programs the data to the individual memory component using the current program pulse value (e.g., using the updated or previously set value).

In view of the disclosure above, various examples are set forth below. It should be noted that one or more features of an example, taken in isolation or combination, should be considered within the disclosure of this application.

Example 1. A system comprising: a set of memory components; and a processing device, operatively coupled to the set of memory components, configured to perform operations comprising: receiving a request to program data in an individual memory component of the set of memory components; computing a plurality of memory reliability criteria associated with the individual memory component; comparing the plurality of memory reliability criteria to one or more threshold values; and selecting a program pulse used to program the data to the individual memory component based on a result of comparing the plurality of memory reliability criteria to the one or more threshold values.

Example 2. The system of Example 1, wherein the plurality of memory reliability criteria comprises an average program erase count (PEC) value and at least one additional metric.

Example 3. The system of Example 2, wherein the at least one additional metric comprises a read bit error rate (RBER) value.

Example 4. The system of any one of Examples 2-3, wherein the at least one additional metric comprises a quantity of inhibited cells that result following initial programming of the individual memory component.

Example 5. The system of Example 4, wherein the inhibited cells represent cells that have been improperly programmed, the quantity of inhibited cells being determined in a verify stage of memory programming operations.

Example 6. The system of any one of Examples 2-5, wherein the at least one additional metric comprises one or more check failure unit count values comprising at least one of one or more check failure bit (CFBit) count values or one or more check failure byte (CFByte) count values.

Example 7. The system of Example 6, the operations further comprising: computing one or more check failure unit count values corresponding to an individual read level of the individual memory component; and comparing the one or more check failure unit count values to a threshold value of the one or more threshold values.

Example 8. The system of Example 7, the operations further comprising: selecting a first value for the program pulse in response to determining that the one or more check failure unit count values fails to transgress the threshold value; and selecting a second value for the program pulse in response to determining that the one or more check failure unit count values transgresses the threshold value.

Example 9. The system of any one of Examples 7-8, the operations further comprising: retrieving the PEC count value corresponding to the individual memory component; comparing the PEC count value corresponding to the individual memory component to an additional threshold value of the one or more threshold values; and selecting a value for the program pulse based on a first result of comparing the one or more check failure unit count values to the threshold value and a second result of comparing the PEC count value corresponding to the individual memory component to the additional threshold value.

Example 10. The system of any one of Examples 7-9, the operations further comprising: accessing a predetermined check failure unit count value associated with the individual read level; and computing the threshold value as a function of the predetermined check failure unit count value.

Example 11. The system of any one of Examples 1-10, wherein the program pulse comprises a trimset voltage value.

Example 12. The system of any one of Examples 1-10, the operations further comprising: storing a look-up table that maps a plurality of program pulse values to respective combinations of the plurality of memory reliability criteria.

Example 13. The system of any one of Examples 1-12, wherein the plurality of memory reliability criteria comprises a quantity of inhibited cells that result following initial programming of the individual memory component and one or more check failure unit count values.

Example 14. The system of Example 13, the operations further comprising: computing the one or more check failure unit count values corresponding to an individual read level of the individual memory component; comparing the one or more check failure unit count values to a threshold value of the one or more threshold values; computing the quantity of inhibited cells corresponding to the individual memory component; and comparing the quantity of inhibited cells to an additional threshold value of the one or more threshold values.

Example 15. The system of Example 14, the operations further comprising: selecting a value for the program pulse based on a first result of comparing the one or more check failure unit count values to the threshold value and a second result of comparing the quantity of inhibited cells to the additional threshold value.

Example 16. The system of any one of Examples 13-15, the operations further comprising selecting a value for the program pulse based on comparing the quantity of inhibited cells associated with the individual memory component to the one or more check failure unit count values associated with an individual read level of the individual memory component.

Methods and computer-readable storage medium with instructions for performing any one of the above Examples.

Figure 7:
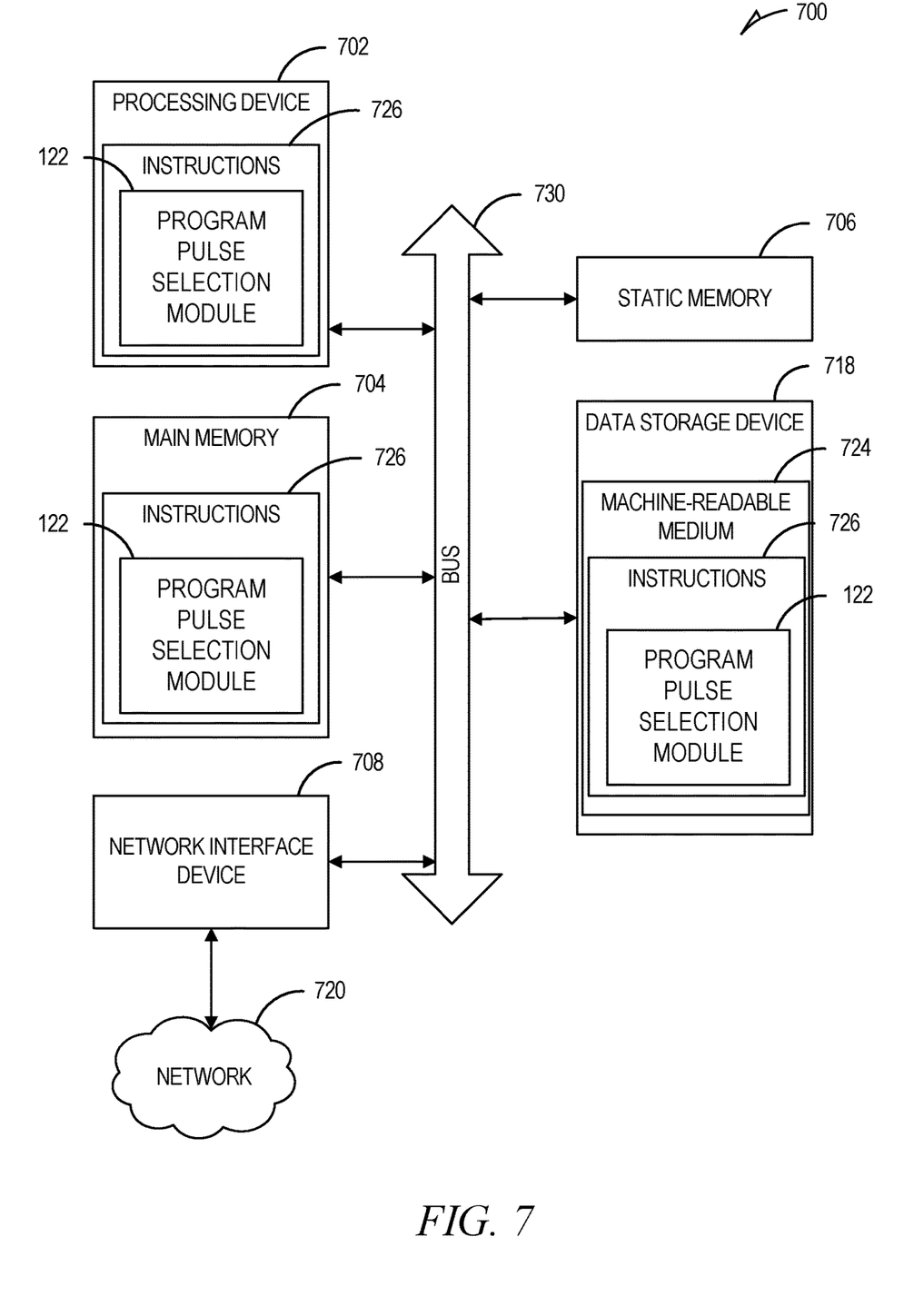
FIG. 7 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 7 illustrates an example machine in the form of a computer system 700 within which a set of instructions can be executed for causing the machine to perform any one or more of the methodologies discussed herein. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the program pulse selection module 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., ROM), flash memory, DRAM such as SDRAM or RDRAM, etc.), a static memory 706 (e.g., flash memory, static random access memory (SRAM), etc.), and a data storage system 718, which communicate with each other via a bus 730.

The processing device 702 represents one or more general-purpose processing devices such as a microprocessor, a central processing unit, or the like. More particularly, the processing device 702 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 702 can also be one or more special-purpose processing devices such as an ASIC, a FPGA, a digital signal processor (DSP), a network processor, or the like. The processing device 702 is configured to execute instructions 726 for performing the operations and steps discussed herein. The computer system 700 can further include a network interface device 708 to communicate over a network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to zone-based decoding (e.g., the program pulse selection module 122 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; ROMs; RAMs; erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a ROM, RAM, magnetic disk storage media, optical storage media, flash memory components, and so forth.

In the foregoing specification, embodiments of the disclosure have been described with reference to specific example embodiments thereof. It will be evident that various modifications can be made thereto without departing from the embodiments of the disclosure as set forth in the following claims. The specification and drawings are, accordingly, to be regarded in an illustrative sense rather than a restrictive sense.

What is claimed is:

1. A system comprising:
a set of memory components; and
a processing device, operatively coupled to the set of memory components, programmed to perform operations comprising:
receiving a request to program data in an individual memory component of the set of memory components;
computing a plurality of memory reliability criteria associated with the individual memory component of the set of memory components, the plurality of memory reliability criteria comprises an average program erase count (PEC) value and at least one additional metric;
comparing the plurality of memory reliability criteria to one or more threshold values; and
selecting a program pulse used to program the data to the individual memory component based on a result of comparing the plurality of memory reliability criteria to the one or more threshold values.

2. The system of claim 1, wherein the at least one additional metric comprises a read bit error rate (RBER) value.

3. The system of claim 1, wherein the at least one additional metric comprises a quantity of inhibited cells that result following initial programming of the individual memory component.

4. The system of claim 3, wherein the inhibited cells represent cells that have been improperly programmed, the quantity of inhibited cells being determined in a verify stage of memory programming operations.

5. The system of claim 1, wherein the at least one additional metric comprises one or more check failure unit count values comprising at least one of one or more check failure bit (CFBit) count values or one or more check failure byte (CFByte) count values.

6. The system of claim 5, the operations comprising:
computing one or more check failure unit count values corresponding to an individual read level of the individual memory component; and
comparing the one or more check failure unit count values to a threshold value of the one or more threshold values.

7. The system of claim 6, the operations comprising:
selecting a first value for the program pulse in response to determining that the one or more check failure unit count values fails to transgress the threshold value; and
selecting a second value for the program pulse in response to determining that the one or more check failure unit count values transgresses the threshold value.

8. The system of claim 6, the operations comprising:
retrieving the PEC count value corresponding to the individual memory component;
comparing the PEC count value corresponding to the individual memory component to an additional threshold value of the one or more threshold values; and
selecting a value for the program pulse based on a first result of comparing the one or more check failure unit count values to the threshold value and a second result of comparing the PEC count value corresponding to the individual memory component to the additional threshold value.

9. The system of claim 6, the operations comprising:
accessing a predetermined check failure unit count value associated with the individual read level; and
computing the threshold value as a function of the predetermined check failure unit count value.

10. The system of claim 1, wherein the program pulse comprises a trimset voltage value.

11. The system of claim 1, the operations comprising:
storing a look-up table that maps a plurality of program pulse values to respective combinations of the plurality of memory reliability criteria.

12. The system of claim 1, wherein the plurality of memory reliability criteria comprises a quantity of inhibited cells that result following initial programming of the individual memory component and one or more check failure unit count values.

13. The system of claim 12, the operations comprising:
computing the one or more check failure unit count values corresponding to an individual read level of the individual memory component;
comparing the one or more check failure unit count values to a threshold value of the one or more threshold values;
computing the quantity of inhibited cells corresponding to the individual memory component; and
comparing the quantity of inhibited cells to an additional threshold value of the one or more threshold values.

14. The system of claim 13, the operations comprising:
selecting a value for the program pulse based on a first result of comparing the one or more check failure unit count values to the threshold value and a second result of comparing the quantity of inhibited cells to the additional threshold value.

15. The system of claim 12, the operations comprising selecting a value for the program pulse based on comparing the quantity of inhibited cells associated with the individual memory component to the one or more check failure unit count values associated with an individual read level of the individual memory component.

16. A method comprising:
receiving a request to program data in an individual memory component of a set of memory components;
computing a plurality of memory reliability criteria associated with the individual memory component, the plurality of memory reliability criteria comprises an average program erase count (PEC) value and at least one additional metric;
comparing the plurality of memory reliability criteria to one or more threshold values; and selecting a program pulse used to program the data to the individual memory component based on a result of comparing the plurality of memory reliability criteria to the one or more threshold values.

17. The method of claim 16, further comprising:
storing a look-up table that maps a plurality of program pulse values to respective combinations of the plurality of memory reliability criteria.

18. The method of claim 16, wherein the at least one additional metric comprises a read bit error rate (RBER) value.

19. A non-transitory computer-readable storage medium comprising instructions that, when executed by a processing device, cause the processing device to perform operations comprising:
receiving a request to program data in an individual memory component of a set of memory components;
computing a plurality of memory reliability criteria associated with the individual memory component, the plurality of memory reliability criteria comprises an average program erase count (PEC) value and at least one additional metric;
comparing the plurality of memory reliability criteria to one or more threshold values; and
selecting a program pulse used to program the data to the individual memory component based on a result of comparing the plurality of memory reliability criteria to the one or more threshold values.

20. The non-transitory computer-readable storage medium of claim 19, wherein the at least one additional metric comprises a read bit error rate (RBER) value.

* * * * *